(12) United States Patent
Castle et al.

(10) Patent No.: US 6,341,163 B1
(45) Date of Patent: Jan. 22, 2002

(54) UNIQUE PHONE ACCESSORY SYSTEM

(75) Inventors: Jeffrey G. Castle, Fairfield; Barry Z. Morgan, Stamford, both of CT (US)

(73) Assignee: Castle Creations, LLC, Fairfield, CT (US)

( * ) Notice: Subject to any disclaimer, the term of this patent is extended or adjusted under 35 U.S.C. 154(b) by 0 days.

(21) Appl. No.: 09/505,014

(22) Filed: Feb. 15, 2000

(51) Int. Cl.$^7$ .................................................. H04M 1/00
(52) U.S. Cl. ............................................................ 379/449
(58) Field of Search ................................. 379/449, 446, 379/454, 455, 420, 447; 455/90, 575; 40/1.5, 1.6

(56) References Cited

U.S. PATENT DOCUMENTS

| | | | |
|---|---|---|---|
| 4,817,139 A | * 3/1989 | Russo | 379/449 |
| 5,659,887 A | * 8/1997 | Ooe | 379/420 |
| 5,703,945 A | * 12/1997 | Smith | 379/446 |
| 5,946,732 A | * 9/1999 | Richards | 40/1.5 |

* cited by examiner

*Primary Examiner*—Jack Chiang
(74) *Attorney, Agent, or Firm*—Cummings & Lockwood

(57) ABSTRACT

The present disclosure relates to a system and an apparatus for providing a unique decorative phone accessory and, more particularly, to a system and an apparatus for securing one or more decorative and/or novelty accessories to a telephone handset in a manner that does not impede, and preferably improves, the ease and comfort associated with such handset usage. According to the present disclosure, a telephone accessory is provided that has three basic features or structural aspects. First, a securement member or mechanism is provided for detachably securing the remainder of the telephone accessory to a telephone handset. Second, an attachment member or mechanism is provided that facilitates detachably attaching a decorative item or member to the securement member or mechanism. And third, a decorative item or member is provided that may be detachably attached to the attachment member or mechanism, which is in turn attached to the securement member or mechanism. As disclosed herein, a variety of approaches and structures are contemplated for achieving a telephone accessory that realizes the aforesaid features and structural aspects.

8 Claims, 15 Drawing Sheets

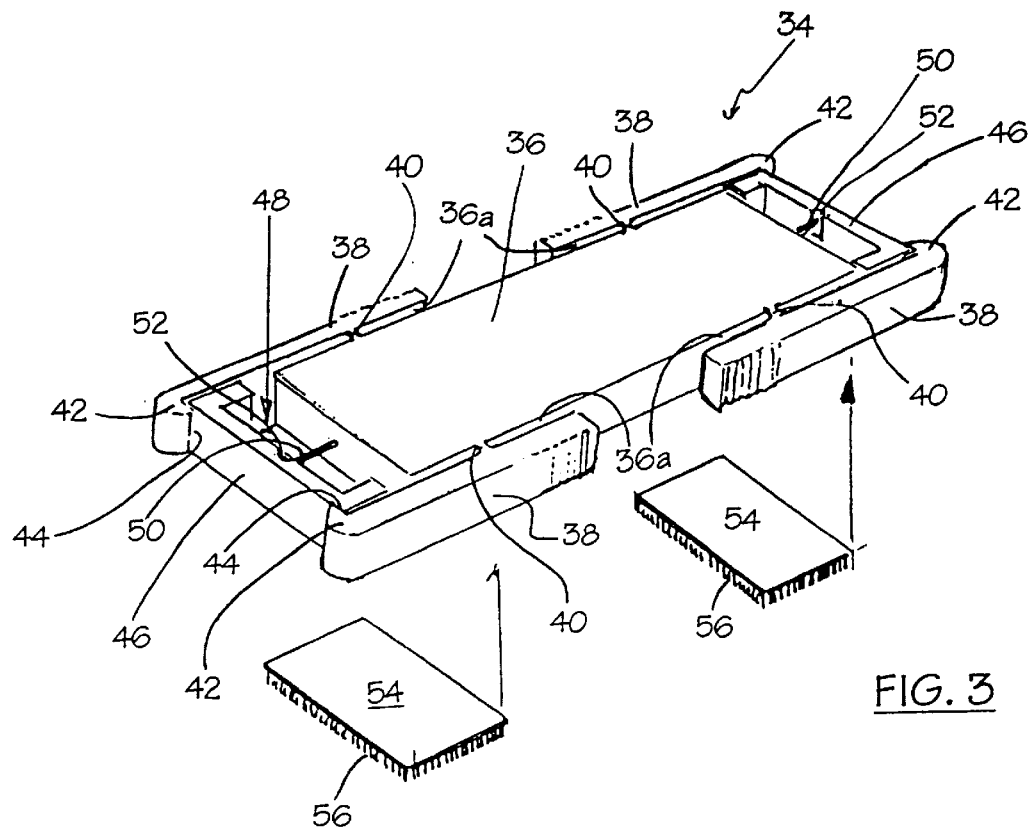
FIG. 3
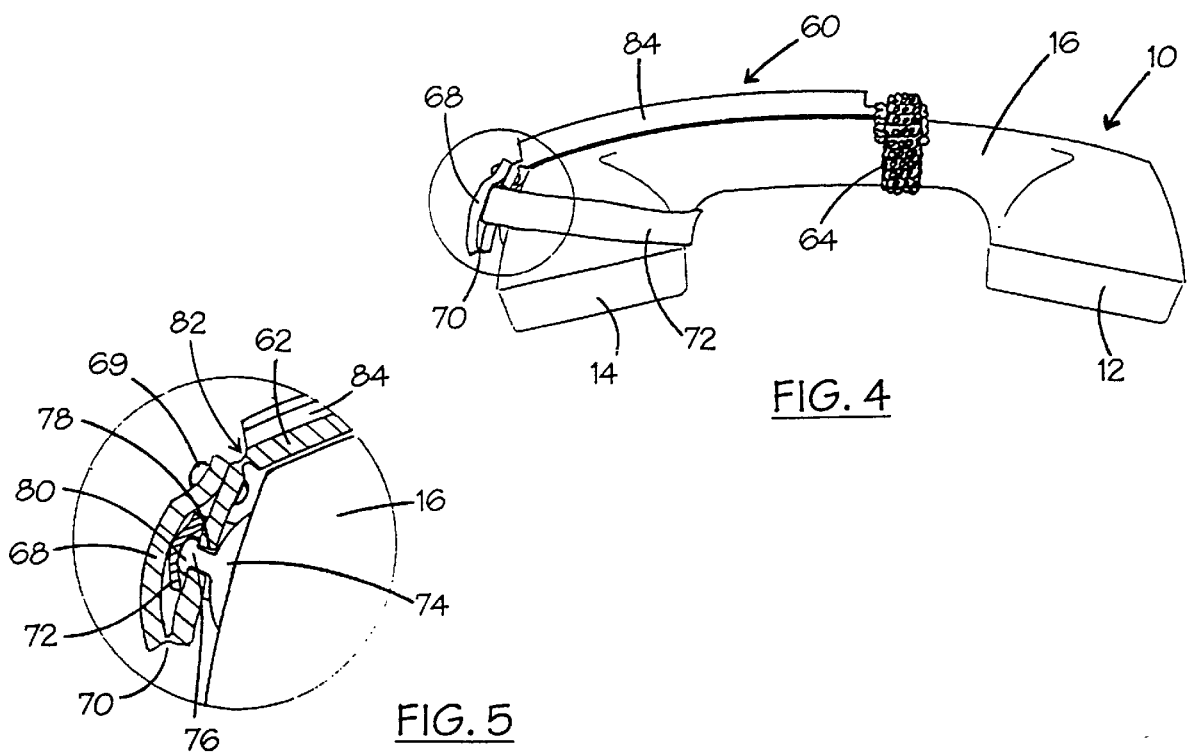
FIG. 4
FIG. 5

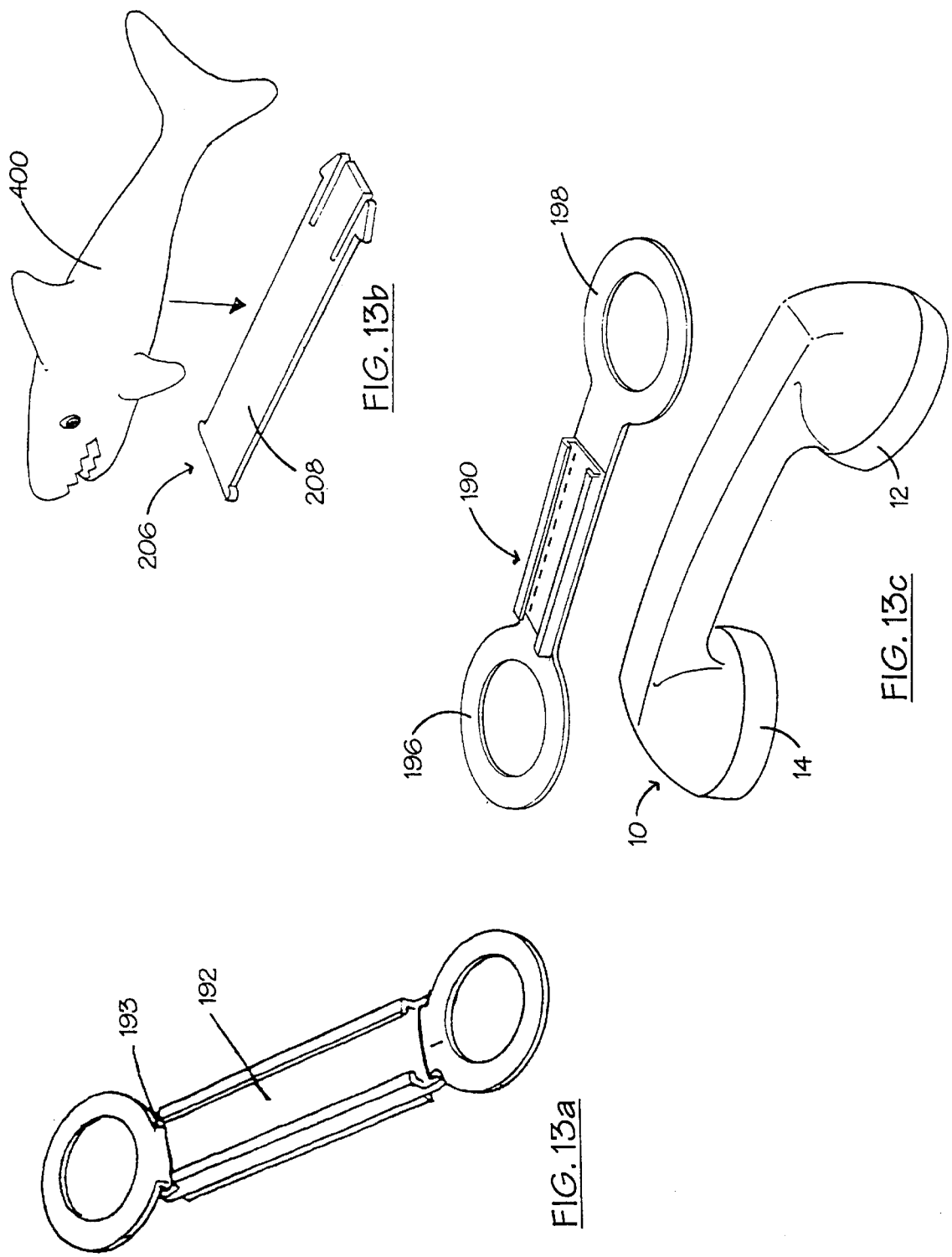

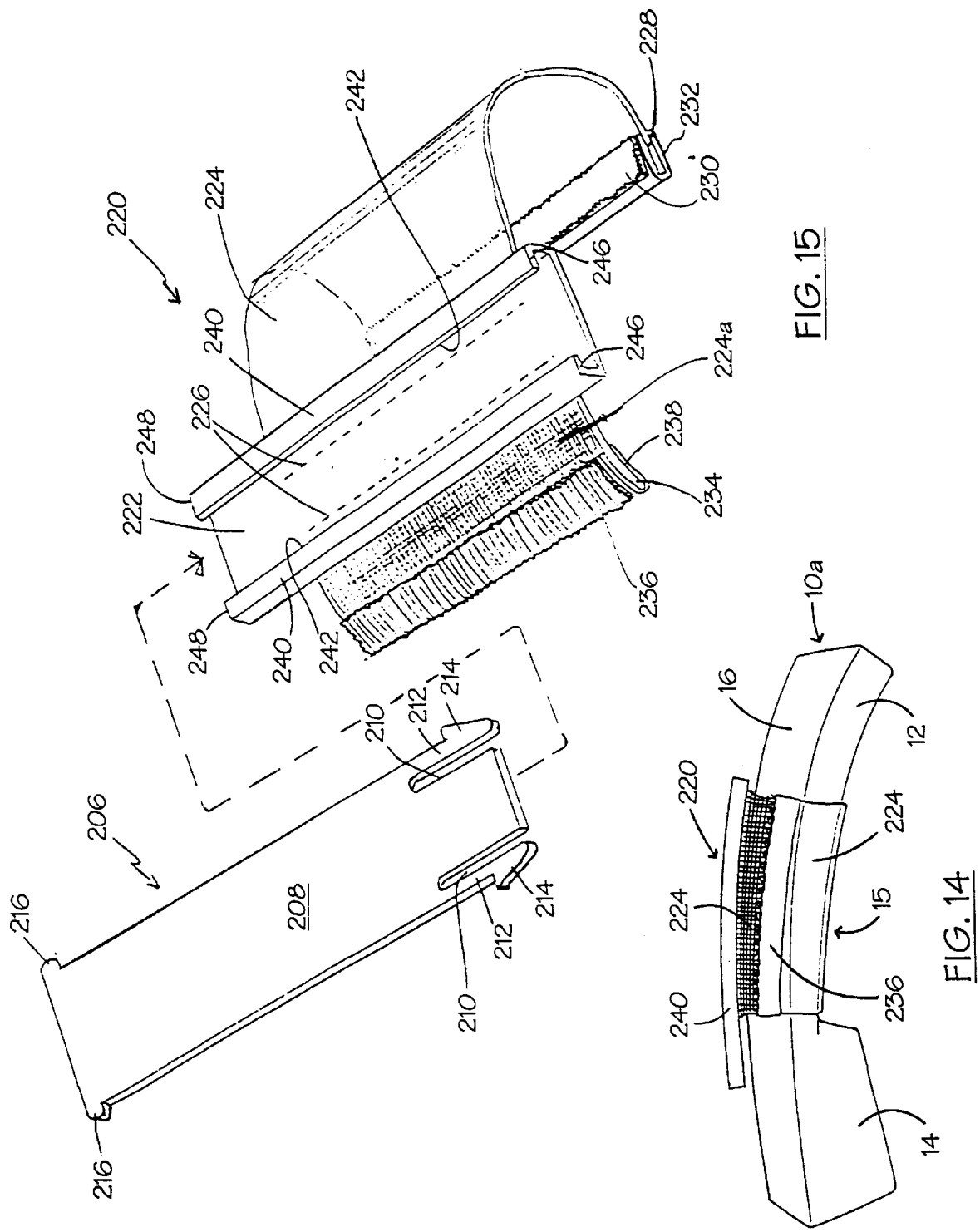

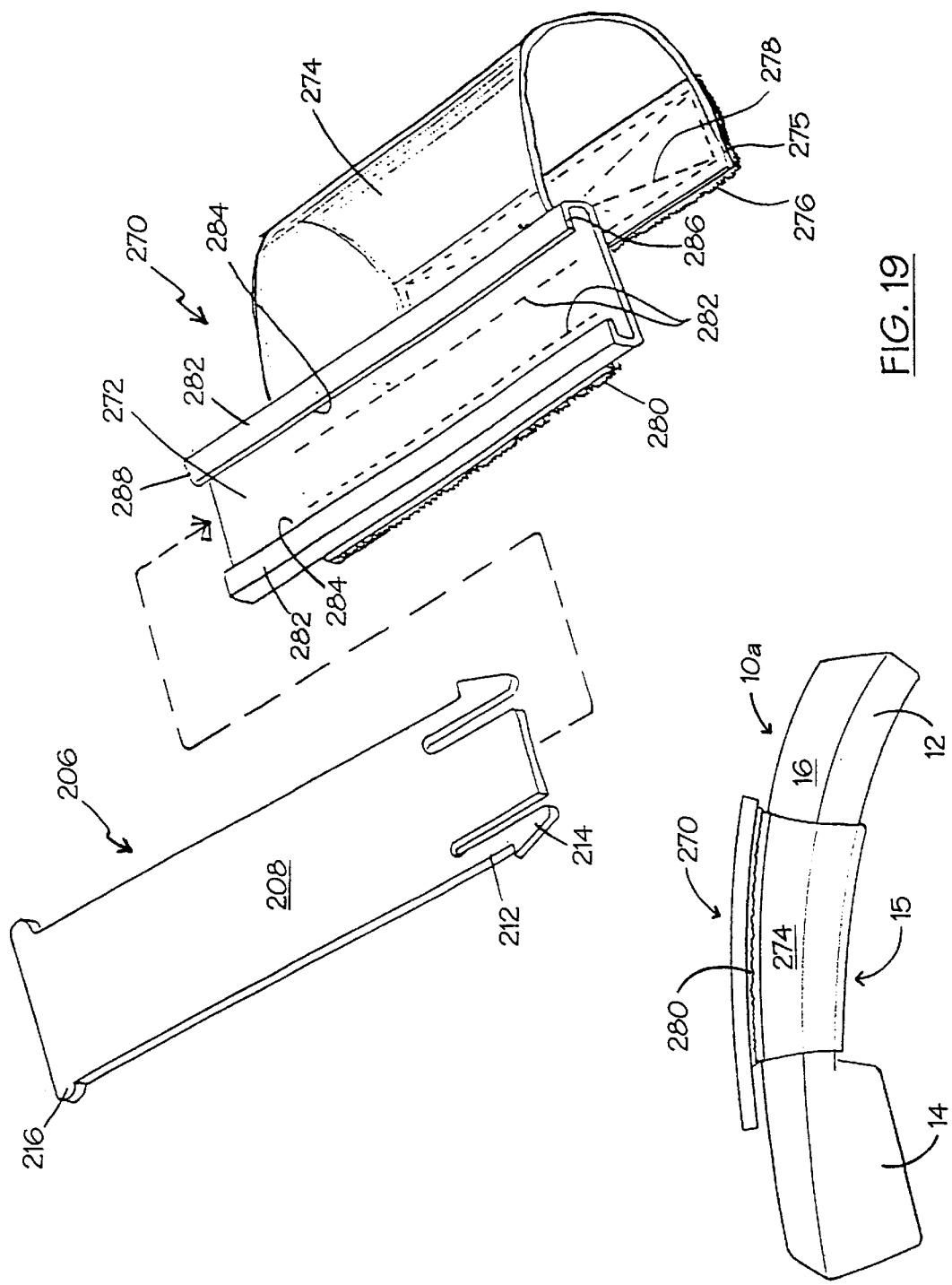

UNIQUE PHONE ACCESSORY SYSTEM

BACKGROUND

1. Field of the Disclosure

The present disclosure relates to a system and an apparatus for providing a unique decorative phone accessory and, more particularly, to a system and an apparatus for securing one or more decorative and/or novelty accessories to a telephone handset in a manner that does not impede, and preferably improves, the ease and comfort associated with such handset usage.

2. Background of Related Art

In the years since the telephone was first commercialized, a variety of handsets have been developed, each aimed at addressing a specifically perceived consumer need. Despite the diversity of handset designs, telephone handsets generally share certain structural features. For example, telephone handsets generally include a speaker spaced apart from a microphone by a handset body. The length and geometry of the handset body is generally selected to optimize the spacing of the speaker and microphone, and to provide ease and comfort in gripping the handset, based on typical human anatomies. Moreover, the surface features of the handset body, e.g., texture, rounded edges, etc., are generally selected to provide enhanced comfort and visual aesthetics.

Many telephone handsets are connected by a cord to a telephone base. Such telephone base/handset units may be stationary, e.g., within a home or office, or mobile, e.g., within a car or plane. The cord is generally detachably connected to the handset and the phone base using conventional snap fit connectors adapted to fit within cooperative receptacles. Electrical connections are typically achieved through interaction between wires within the snap fit connector and corresponding electronic posts within the receptacle. Typically, the phone cord attaches to the handset adjacent the microphone. As a general matter, the phone cord does not attach to the handset body in the region between the speaker and the microphone so as to minimize interference with the gripping of the handset.

The handset is typically sized to fit within a cooperative cavity formed in the phone base or to rest on a frame or "hook" projecting from the base. In either case, placement of the phone handset within the cooperative cavity or on the projecting frame/hook generally depresses a movable element that cooperates with a switch. Depression of the movable element serves to "hang up" the telephone, i.e., disconnect an existing telephonic communication (unless a speaker associated with the base has been activated).

An alternative phone handset is cordless. Cordless telephone handsets may be adapted to communicate with a telephone base located in proximity to the cordless handset, e.g., within a room or building. Alternatively, the cordless handset may be fully mobile, e.g., utilizing satellite, cellular or other wireless technology. Cordless handsets generally include a plurality of buttons formed in or on the handset body, e.g., between the speaker and the microphone, to facilitate dialing and other communicative functions. In addition, a switch for disconnecting a telephonic communication is generally provided on the cordless phone handset, e.g., adjacent the buttons. Many portable phones include hinged bodies that permit a reduction in size when not in use. Thus, the cordless phone handset permits a user to perform most telephonic functions independent of, or remotely from, a telephone base.

Phone "cradles" or "shoulder rests" have been developed to facilitate a user's freedom of movement while speaking on the telephone. Thus, a typical phone cradle or shoulder rest is designed to be used in conjunction with a handset body and may be formed integral with the handset. Cradles/shoulder rests generally cooperate with the side of the handset body opposite the exposed speaker and microphone faces. A typical cradle/shoulder rest includes a curvilinear face designed to cooperate with a user's shoulder, thereby permitting the handset to be more easily captured between a user's ear and shoulder. In this way, both hands of a user may be freed for other purposes.

Telephones are found in nearly every home, office, and workplace, in cars, planes and trains, and in pockets, purses and briefcases. Individuals spend countless hours dialing, answering and speaking on the phone. Despite the prevalence of telephones in today's society, little has been done to customize and/or personalize exterior aspects of the telephone. To the extent novelty phones have been developed, the general approach has been to form the entire telephone base/handset into a decorative shape, e.g., a football helmet or other novel shape. Such decorative shapes, once selected, are permanent. Moreover, few decorative phone choices are provided and those choices that are available may not be desirable for particular settings or for long periods of time.

Based on the foregoing, a need exists for a system and an apparatus offering a unique phone accessory that does not impede the ease and comfort associated with handset usage.

SUMMARY OF THE DISCLOSURE

According to the present disclosure, a telephone accessory is provided that has three basic features or structural aspects. First, a securement member or mechanism is provided for detachably securing the remainder of the telephone accessory to a telephone handset. Second, an attachment member or mechanism is provided that facilitates detachably attaching a decorative item or member to the securement member or mechanism. And third, a decorative item or member is provided that may be detachably attached to the attachment member or mechanism, which is in turn attached to the securement member or mechanism. As disclosed herein, a variety of approaches and structures are contemplated for achieving a telephone accessory that realizes the aforesaid features and structural aspects.

Thus, in various embodiments of the present disclosure, a securement member, an attachment member, and a decorative member are provided. The securement member is adapted to be detachably connected to a telephone handset. The securement member typically includes a securement body and at least one cooperative element that extends from the securement body to facilitate detachable connection to the telephone handset. A variety of cooperative elements are contemplated, as described in greater detail with reference to the preferred embodiments set forth below.

An attachment member or mechanism is also typically provided that may be associated with the securement body to facilitate engagement of the decorative member to the securement member. The attachment member may take a variety of structural forms, as discussed herein. Decorative members for use with the telephone accessory of the present disclosure may also take a variety of forms. Thus, novelty items based on animals, sports figures, cartoon figures, and the like are contemplated for use herewith.

BRIEF DESCRIPTION OF THE FIGURES

To assist those of ordinary skill in the art in appreciating preferred embodiments of the present disclosure, reference is made to the figures appended hereto in which:

FIG. 3 is an exploded plan view of a clip member adapted to cooperate with the embodiment of FIGS. 1 and 2;

FIG. 4 is a side view of aspects of an alternative embodiment of a telephone accessory according to the present disclosure that is detachably connected to a phone handset;

FIG. 5 is a partial side view of the designated portion of the alternative embodiment of FIG. 4, partially in cross section;

FIG. 13 is an exploded view of aspects of the alternative embodiment of FIGS. 12 and 12a;

FIGS. 13a–13e are plan views of alternative embodiments of certain aspects of the present disclosure;

FIG. 14 is a side view of aspects of a further embodiment of a telephone accessory according to the present disclosure that is detachably connected to a phone handset;

FIG. 15 is an exploded view of aspects of the further embodiment of FIG. 14 of the present disclosure;

FIG. 18 is a side view of aspects of an alternative embodiment of a telephone accessory according to the present disclosure that is detachably connected to a phone handset;

FIG. 19 is an exploded view of aspects of the alternative embodiment of FIG. 18;

DETAILED DESCRIPTION OF PREFERRED EMBODIMENTS

According to the present disclosure, a unique system and apparatus are provided for use with a telephone handset. It is contemplated that the unique system and apparatus of the present disclosure may be used with any type of telephone handset, including without limitation telephone handsets that are joined to a base by cord, cordless handsets, and portable, cellular, satellite or other mobile phone handsets. Generally, the system/apparatus of the present disclosure permits a user to detachably connect a decorative accessory to a phone handset in a manner that does not impede, and preferably improves, the ease and comfort associated with handset usage. An unlimited range and variety of decorative accessories may be provided, and such decorative accessories are preferably interchangeable, thereby providing the user with tremendous freedom in selecting a decorative accessory consistent with his/her mood and surroundings. Thus, the present disclosure advantageously permits customization and/or personalization of a user's telephone in a non-permanent and convenient manner.

Figure 1:
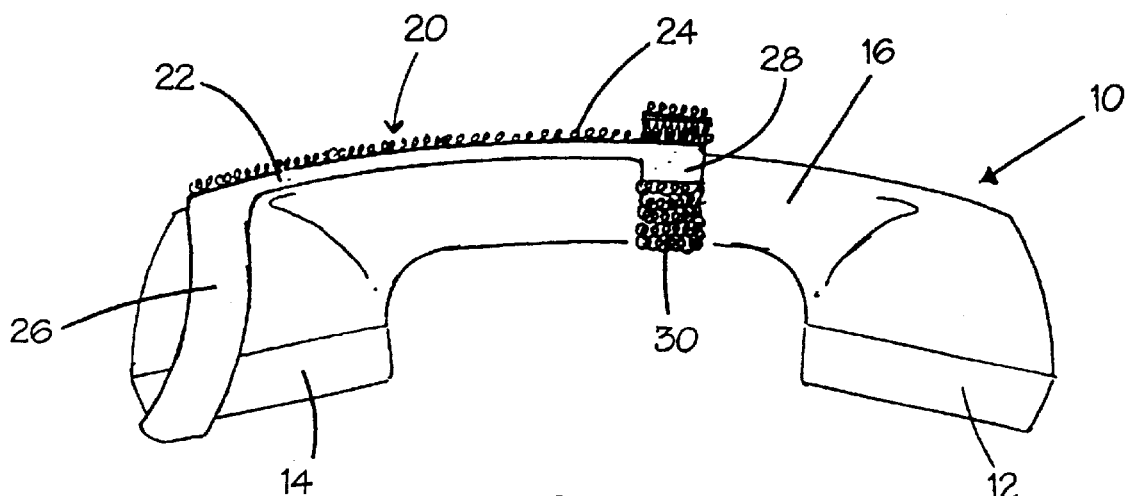
FIG. 1 is a side view of aspects of a first embodiment of a telephone accessory according to the present disclosure that is detachably connected to a phone handset.
Figure 2:
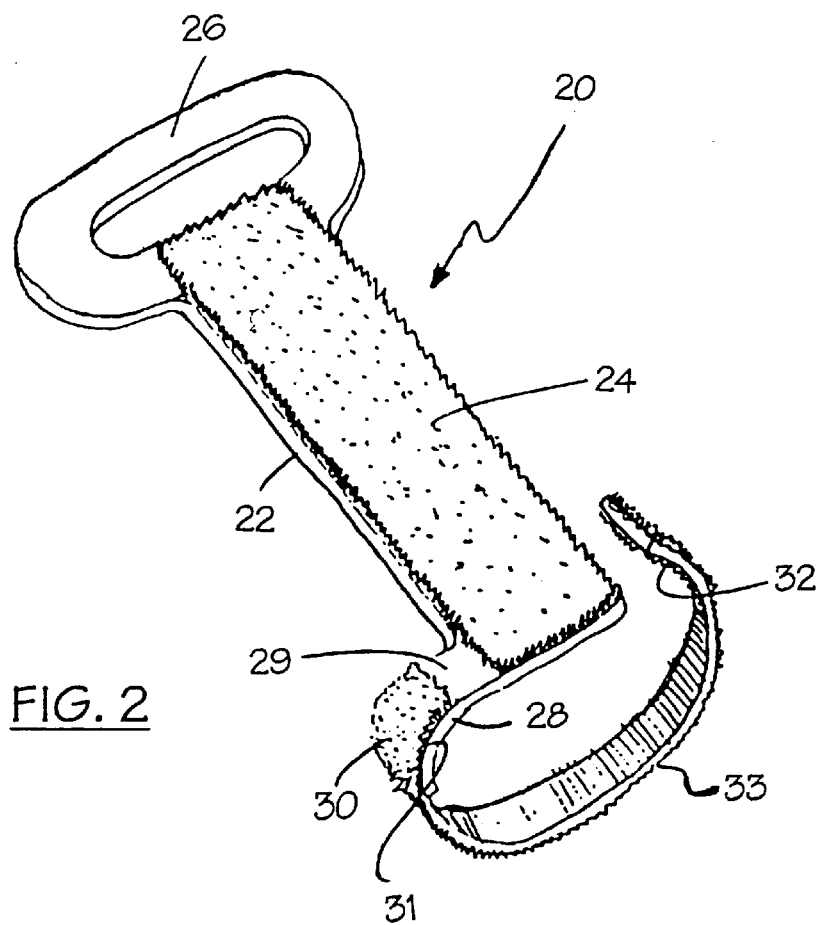
FIG. 2 is a plan view of the embodiment of the present disclosure depicted in FIG. 1.

Referring to FIGS. 1–3, a first embodiment of a telephone accessory securement member 20 of the present disclosure is depicted in cooperation with telephone handset 10. As is typical of telephone handsets, telephone handset 10 includes a handset body 16 having a microphone (not pictured) in region 12 and a speaker (not pictured) in region 14. As will be appreciated by a person of skill in the art, the precise geometry, dimensional properties, and aesthetic appearance of telephone handset 10 is easily accommodated by the structural aspects of the telephone accessory of the present disclosure, and therefore such geometric, dimensional and aesthetic aspects of the handset are not limiting on the applicability of the telephone accessory of the present disclosure.

In the embodiment of FIGS. 1–3, telephone accessory securement member 20 includes a body 22 to which is secured a "Velcro" pad 24. As is well known in the art, typical "Velcro" structures cooperate and engage through interaction between cooperative "hooks" and "loops". Thus, Velcro pad 24 may feature either the "hook" or "loop" aspect of the Velcro mechanism. In either case, Velcro pad 24 may be joined to body 22 through conventional mounting means, e.g., glue and/or stitching.

With particular reference to FIG. 2, body 22 forms a loop 26 extending from one end thereof. Preferably, body 22 is integrally formed with loop 26 and is fabricated from a stretchable material, e.g., a latex rubber. Extending from the opposite end of body 22 is a strap 28. Joined to strap 28 at interface 31 is a two-sided "Velcro" extension 30. Two-sided Velcro extension includes a first face 33 that includes "hoops" or "loops," and a second opposite face 32 that includes the opposite interactive feature, i.e., "loops" or "hooks." Preferably, Velcro pad 24 and first face 33 feature the same Velcro aspect, i.e., either "loops" or "hooks." Preferably, region 29 of strap 28 is exposed, i.e., not covered by Velcro extension 30, to enhance the flexibility of strap 28. The length of strap 28/velcro extension 30 is such that a full circling of handset body 16 may be achieved (see FIG. 1) and some degree of overlap between Velcro extension 30 and Velcro pad 24 may be achieved. Thus, Velcro extension 30 becomes detachably secured to Velcro pad 24.

To attach securement member 20 to telephone handset 10, loop 26 is generally stretched around region 14 of handset 10 and body 22 is laid flat along the relatively flat face of handset body 16 with Velcro pad 24 exposed. The flexibility and relative strength of the material from which loop 26 is fabricated contributes to the secure interaction between securement member 20 and handset 10. Strap 28/velcro extension 30 is then wrapped around the midsection of handset body 16 and Velcro face 32 interacts with Velcro pad 24 to secure strap 28/extension 30 in place. Although the relative dimensions of securement member 20 may vary depending upon such factors as the size of the handset, the size of the Velcro region desired, and the like, in a preferred embodiment of the present disclosure, Velcro pad 24 is approximately four inches in length.

Referring to FIG. 3, attachment member 34 includes a central body 36 and four locking arms 38 joined to central body 36 by extensions 40. Extensions 40 are of sufficient length to permit locking arms 38 to pivot to a limited degree relative to central body 36. At one end of each locking arm 38 is a hook 42 that is adapted to engage cooperative faces 44 of capture plates 46. A capture plate 46 is preferably provided at each end of central body 36. Optionally, biasing members, e.g., leaf springs (not pictured) may be provided to bias locking arms 38 into engagement with capture plates 46, e.g., in the side regions 36a on central body 36. Each capture plate 46 is joined to central body 36 by a living hinge 48, such that capture plate 46 is adapted to pivot along a line that is perpendicular to the axis defined by extensions 40 about which locking arms 38 are allowed to pivot. A pair of pins 50 extend from central body 36 and adapted to nest within cooperative slots formed in capture plates 46. Pins 50 are preferably provided with points at the ends that cooperate with slots 52.

Velcro pad(s) 54 are mounted to the "undersurface" of central body 36 to facilitate interaction between attachment member 34 and securement member 20. Although two Velcro pads 54 are depicted, the number of Velcro pad(s) 54 is a matter of clear design choice in view of the intended function of Velcro pad(s) 54 according to the present disclosure. Thus, it is contemplated that a single Velcro pad 54 of suitable size may be utilized, provided adequate securement between attachment member 34 and securement member 20 is accomplished. As discussed hereinabove, Velcro pad 54 may have "loops" or "hooks" exposed on face(s) 56. The selection of "loops" or "hooks" may be made based on the prior decision made with respect to Velcro pad 24 on securement member 20. The underside of central body 36 may be understood as the face toward which living hinge 48 pivots.

Figure 26:
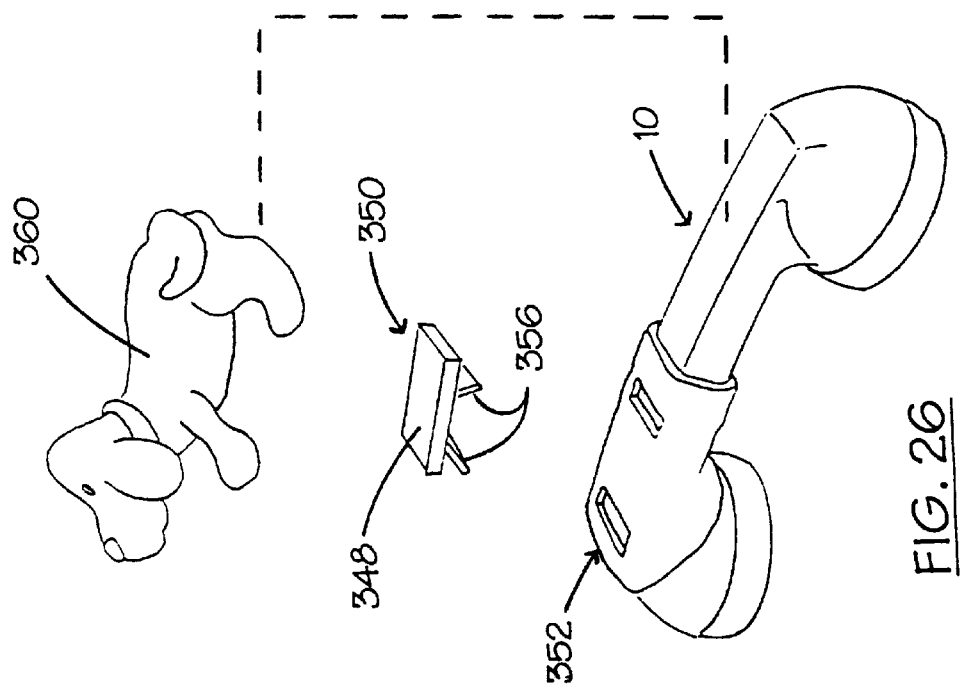

In use, a decorative element such as dog 360 depicted in FIG. 26, may be captured by attachment member 34, secured to securement member 20, and detachably connected to handset 10. The capture of dog 360 is accomplished by pivoting locking arms 38 relative to extensions 40, thereby freeing capture plates 46 to pivot relative to living hinges 48 and exposing pins 50 from slots 52. Oppositely directed pins 50 puncture dog 360, e.g., at spaced positions along the underside of the dog's body, and capture plates 46 are moved back into their initial positions, thereby pinching a portion of the dog's underbelly within slots 52. Hooks 42 of locking arms 38 engage cooperative faces 44 on capture plates 46, optionally under the action of biasing members as discussed hereinabove. Once captured within slots 52, the decorative element is generally prevented from detachment therefrom unless capture plates 46 are freed from hooks 42 and rotated relative to living hinges 48.

Attachment member 34 may be utilized to secure virtually any commercially available fabric or plush character to securement member 20. Thus, the telephone accessory of the present disclosure may be advantageously employed to detachably secure a host of commonplace decorative elements to a telephone handset 10. Such flexibility contributes significant flexibility to a user's selection and interchange of decorative elements. To change decorative elements, the user merely detaches Velcro pad(s) 54 from Velcro pad 24, pivots locking arms 38 and capture plates 46, removes the preceding decorative element, and reverses the process.

Figure 6:
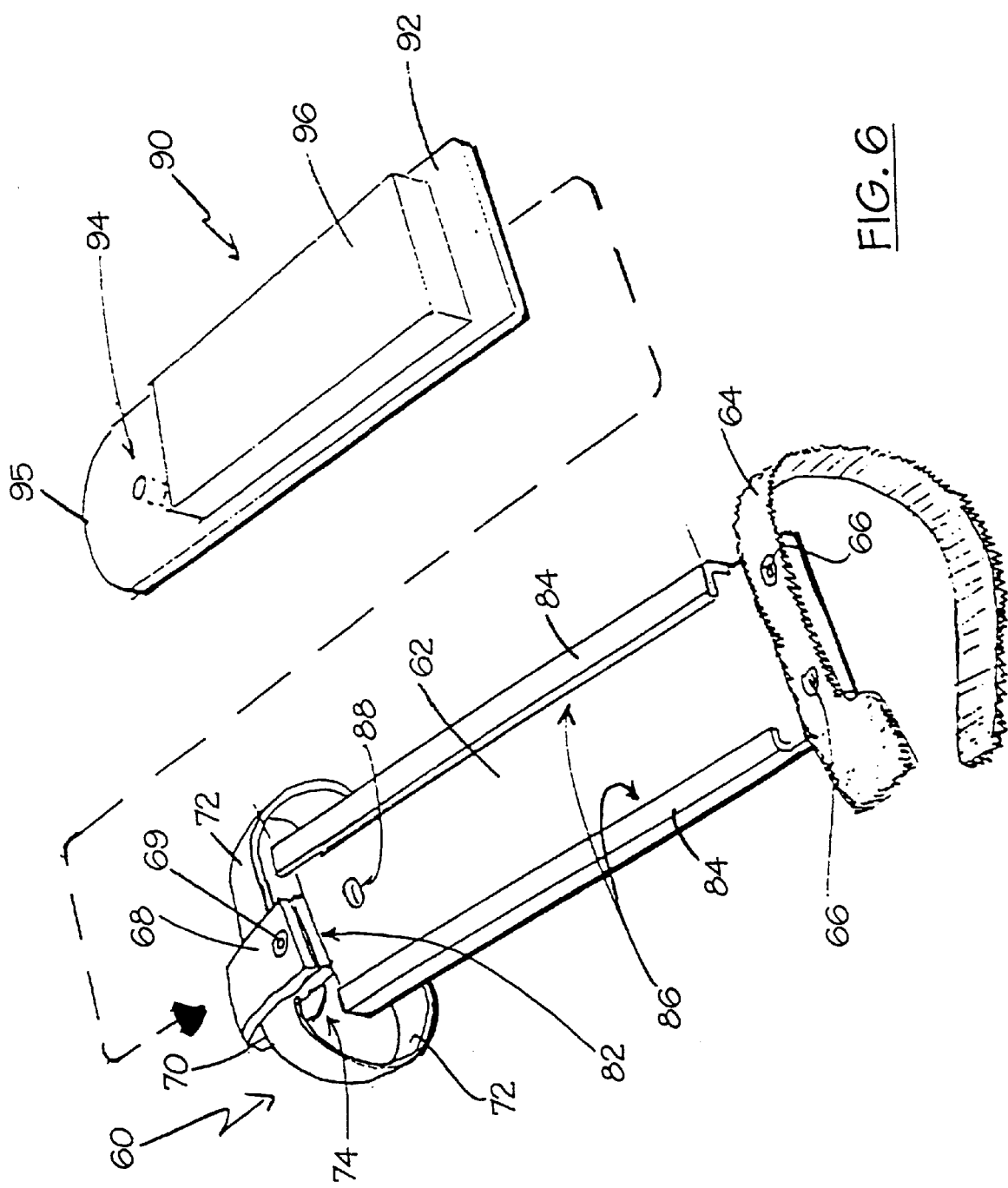
FIG. 6 is an exploded view of aspects of the alternative embodiment of FIGS. 4 and 5.

Referring to the alternative embodiment of FIGS. 4–6, a telephone accessory securement element 60 is provided that includes a body 62, a first strap 64 joined to body 62, e.g., by rivets 66, and a second strap 68 joined to body 62, e.g., by rivet 69. As shown, second strap 68 includes a living hinge 70 such that second strap 70 captures flexible band 72 between respective faces of second strap 70. In a preferred embodiment of securement member 60, a suction cup 74 is mounted to second strap 70 adjacent flexible band 72. As shown in FIG. 5, suction cup 74 includes a stem 76 that extends through an aperture 78 formed in second strap 68 and is secured by knob 80 relative thereto. Suction cup 74 advantageously assists in securing and fixing the relative position of securement member 60 relative to handset 10.

In a preferred embodiment, second strap 68 may be integrally formed with body 62 of securement member 60, e.g., from a suitable plastic material. Thus, second strap 68 may be allowed to move or pivot relative to body 62 through a region of reduced thickness as shown in FIG. 5 at 82. Flexible band 72 is preferably fabricated from a stretchable material, e.g., rubber, to facilitate encircling of region 14 of handset 10 (see FIG. 4). Flexible band 72 may take the form of a conventional rubber band, provided sufficient wall thickness and width are provided to minimize the likelihood of undesired failure. First strap 64 may be advantageously fabricated from "Velcro" with opposing "hook" and "loop" faces, as will be apparent to persons skilled in the art. Thus, once first strap 64 encircles the midsection of body 16 of handset 10, the overlap of opposed Velcro faces of strap 64 permits facile detachable securement thereof.

Body 62 of securement member 60 is preferably provided with L-shaped side walls 84 that define elongated channels 86. The height of L-shaped size walls 84 is typically selected to accommodate cooperative engagement with attachment member 90, as described hereinbelow. An aperture 88 may be provided in body 62, for reasons also discussed with reference to attachment member 90. Securement member 60 may thus be easily secured to handset 10 by stretching flexible band 72 around region 14, pushing against strap 68 to cause suction cup 74 to releasably engage the opposed face of region 14, placing body 62 in juxtaposition with the relatively flat face of body 16, and wrapping first strap 64 therearound. Opposed Velcro faces of strap 64 releasably secure strap 62 in place around body 16.

With reference to FIG. 6, attachment member 60 include a plate 92 having a pin 94 protruding therefrom. Pin 94 may be fixedly positioned relative to plate 92 or may be movable with respect thereto, and is preferably sized and configured to fit within aperture 88 when plate 92 is desirably positioned relative to body 62 of securement member 62. Thus, in the case where pin 94 is movable relative to plate 92, the user may slide pin 94 into engagement with aperture 88 once alignment is achieve. Alternatively, pin 94 and aperture 88 may be omitted, and secure positioning of plate 92 relative to body 62 may be achieved through alternative means, e.g., friction of plate 92 within channels 86. Of note, strap 64 may advantageously function as a stop preventing plate 92 from travelling any further than desired within channels 86.

Plate 92 preferably includes rounded face(s) 95 to facilitate introduction and/or travel of plate 92 relative to securement member 60. The clearance within channels 86 may be advantageously on the order of 1/16 inch, although alternative dimensions are contemplated. The materials of construction of plate 92 and body 62 are preferably selected to minimize the drag experienced therebetween, as will be known to persons skilled in the art. Plate 92 is also preferably provided with an attachment block 96 to facilitate cooperative interaction with a decorative element, e.g., dog 360 depicted in FIG. 26. Attachment block 96 may be secured to plate 92 in conventional ways, e.g., glue, two-sided tape, foam tape, or the like. Attachment block 96 may be fabricated from a relatively pliable material, e.g., cork, that permits a decorative character to be readily secured thereto, e.g., by way of staple(s), pin(s) or the like. Attachment block 96 is preferably dimensioned such that, when joined to plate 92, it is dimensioned to ride above L-shaped walls 84 or be sufficiently narrow not to contact L-shaped walls 84 as plate 92 is slid relative to channels 86. Alternatively, attachment block 96 may utilize other attachment means disclosed herein, e.g., the Velcro pad arrangement of FIGS. 1–3.

In use, a decorative member is joined to attachment block 96 of attachment member 90. For example, the decorative member may be attached by pins or staples to attachment block 96 that is fabricated from cork. Plate 92 is slid within channels 86 of securement member 60 and, optionally, pin 94 may be advanced into aperture 88. Band 72 is wrapped around region 14 of handset 10, suction cup 74 is pressed into engagement therewith, and Velcro strap 64 is encircled around body 16 of handset 10 and joined to itself. In this way, a variety of decorative members may be easily mounted to telephone handsets 10 in an unobtrusive, yet reliable manner.

Figure 7:
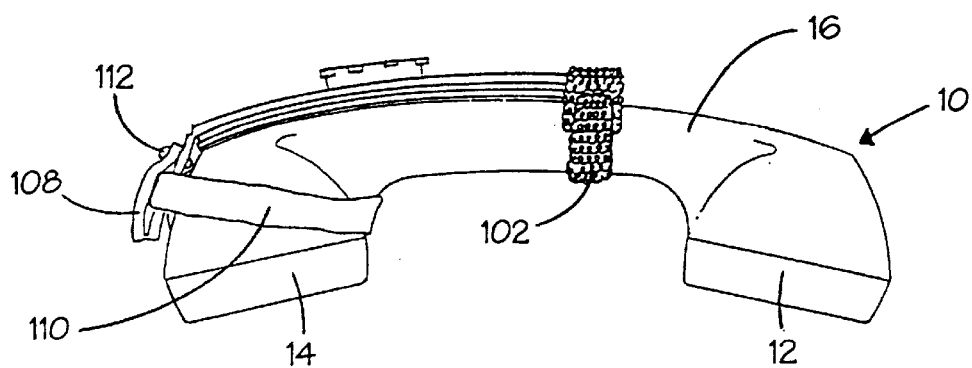
FIG. 7 is a side view of aspects of a further embodiment of a telephone accessory according to the present disclosure that is detachably connected to a phone handset.
Figure 8:
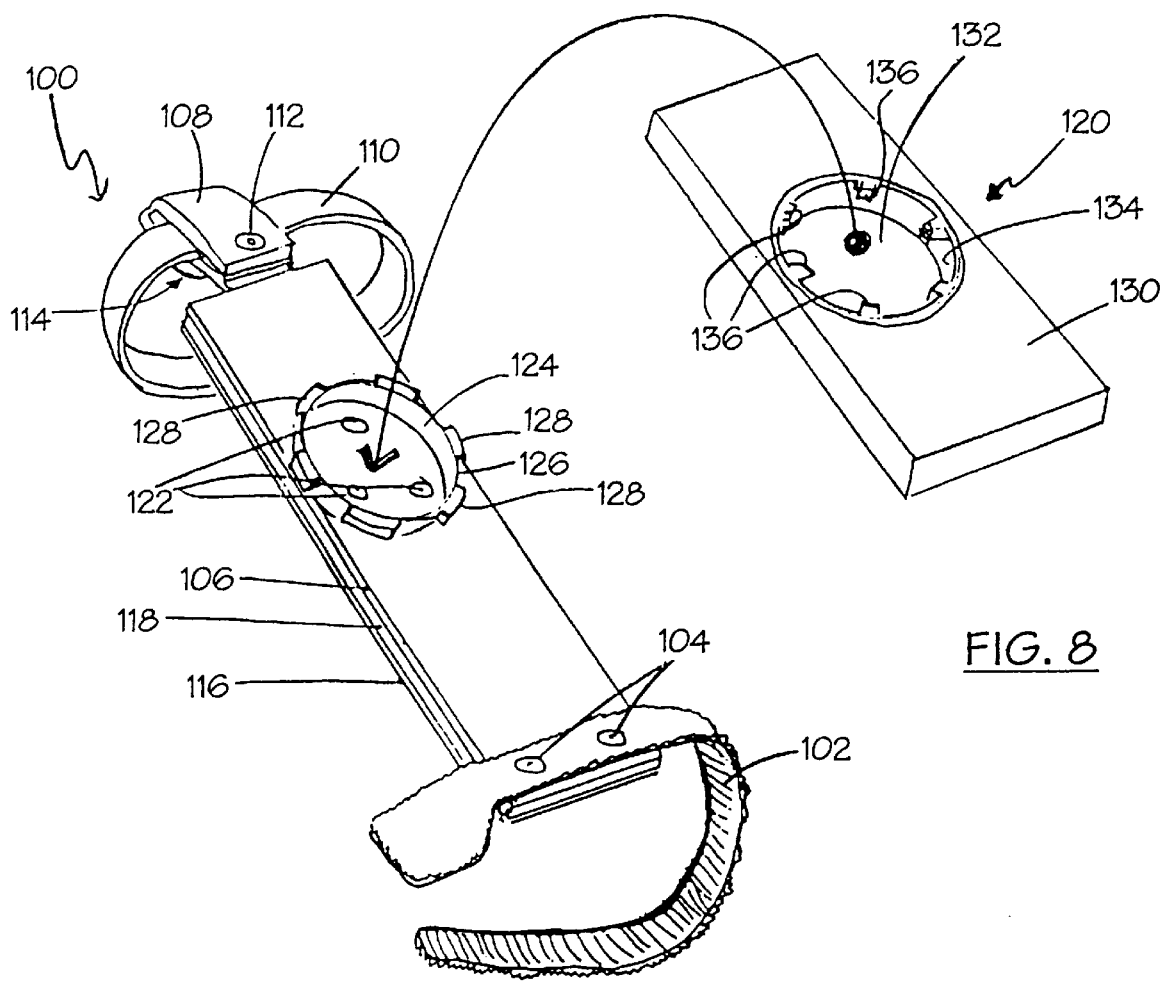
FIG. 8 is an exploded view of aspects of the further embodiment of FIG. 7.

Turning to the alternative embodiment of FIGS. 7 and 8, securement member 100 shares many structural similarities with securement member 60 described hereinabove. Thus, securement member 100 includes first strap 102 joined by a pair of rivets 104 to a body 106, a second strap 108 that captures a flexible band 110 when riveted by rivet 112, and a suction cup 114. However, securement member 100 differs from securement member 60 in that a surface sheet 116 is joined to body 106 by foam tape 118. Surface sheet 116 is preferably fabricated from a material that contributes surface friction, thereby minimizing the likelihood that securement member 100 will shift unnecessarily relative to handset 10. For example, surface sheet 116 may be fabricated from a rubber material and may feature surface irregularities or designs to minimize undesirable slippage, as will be apparent to persons skilled in the art.

Securement member 100 further differs from securement member 60 in the manner in which it is intended to cooperatively interact with attachment member 120. In particular, securement member 100 includes a substantially cylindrical extension 124 mounted to body 106, e.g., by rivets 122. Molded into the outer wall 126 of cylindrical extension 124 are a plurality of camming faces 128, as are conventionally used in pill bottle that are adapted to cooperate with cooperative camming structures on pill lids. Preferably, stops (not pictured) are molded into outer wall 126 in association with each camming face 128, for reasons discussed hereinbelow.

Attachment member 120 includes an attachment body 130 into which is molded a cylindrical cavity 132 that is defined by a cavity wall 134. A plurality of camming teeth 136 are formed in cavity wall 134. Typically, the number of camming teeth 134 is equal to the number of camming faces 128 formed in outer wall 126 of cylindrical extension 124, although exact correspondence is not generally required. The size and spacing of camming teeth 136 is such that camming teeth 136 may be fit between camming faces 128 and rotated into engagement therewith. In addition, the relative positioning of camming teeth 136 is such that, when camming teeth 136 have been rotated into engagement with camming faces 128, attachment body 130 is substantially aligned with body 106. Stops (not pictured) may provide a surface against which camming teeth 136 may rest when fully engaged, thereby preventing camming teeth 136 from camming free of camming faces 128. As will be readily apparent to persons of ordinary skill, the orientation of camming teeth and camming faces may be reversed, such that camming teeth 136 are associated with securement member 100, whereas camming faces are associated with attachment member 120.

Attachment member 120 is adapted to cooperate with decorative member(s), such as dog 360 of FIG. 26, through a variety of securement means. For example, attachment body 130 may be fabricated from a suitably pliable material to facilitate stapling and/or pinning of decorative member(s) thereto. Alternative securement means are described herein, any one of which may find applicability with attachment member 130. In use, attachment member 130 is joined to a decorative member, camming teeth 136 are aligned with spacing between adjacent camming faces 128, and attachment body 130 is rotated relative to body 106. Optionally, it may be necessary to press attachment body 130 toward body 106 to allow rotation thereof, i.e., to permit camming interaction between camming teeth 136 and camming faces 128. In this way, a bayonet-type connection is made between attachment member 130 and securement member 100. Securement member 100 is detachably connected to a handset in the same manner as described for securement member 60, discussed hereinabove. Thus, attachment member 130 and securement member 100 permit ready mounting of decorative member(s) to telephone handsets, for personalization and/or decoration thereof.

Figure 9:
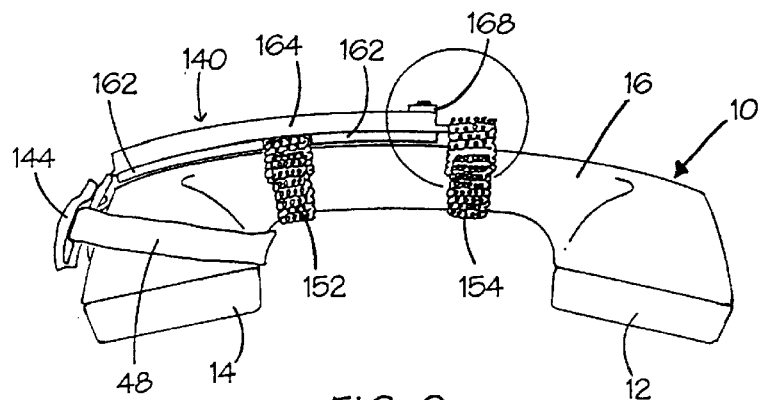
FIG. 9 is a side view of aspects of a further alternative embodiment of a telephone accessory according to the present disclosure that is detachably connected to a phone handset.
Figure 10:
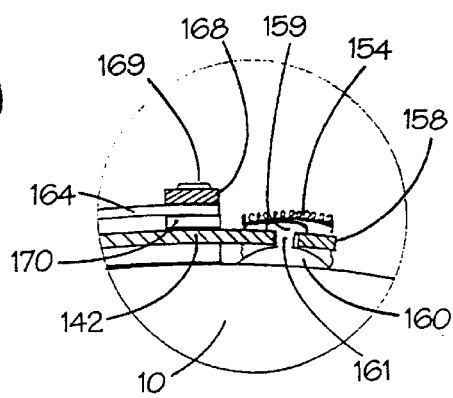
FIG. 10 is a partial side view of the designated portion of the further alternative embodiment of FIG. 9, partially in cross section.
Figure 11:
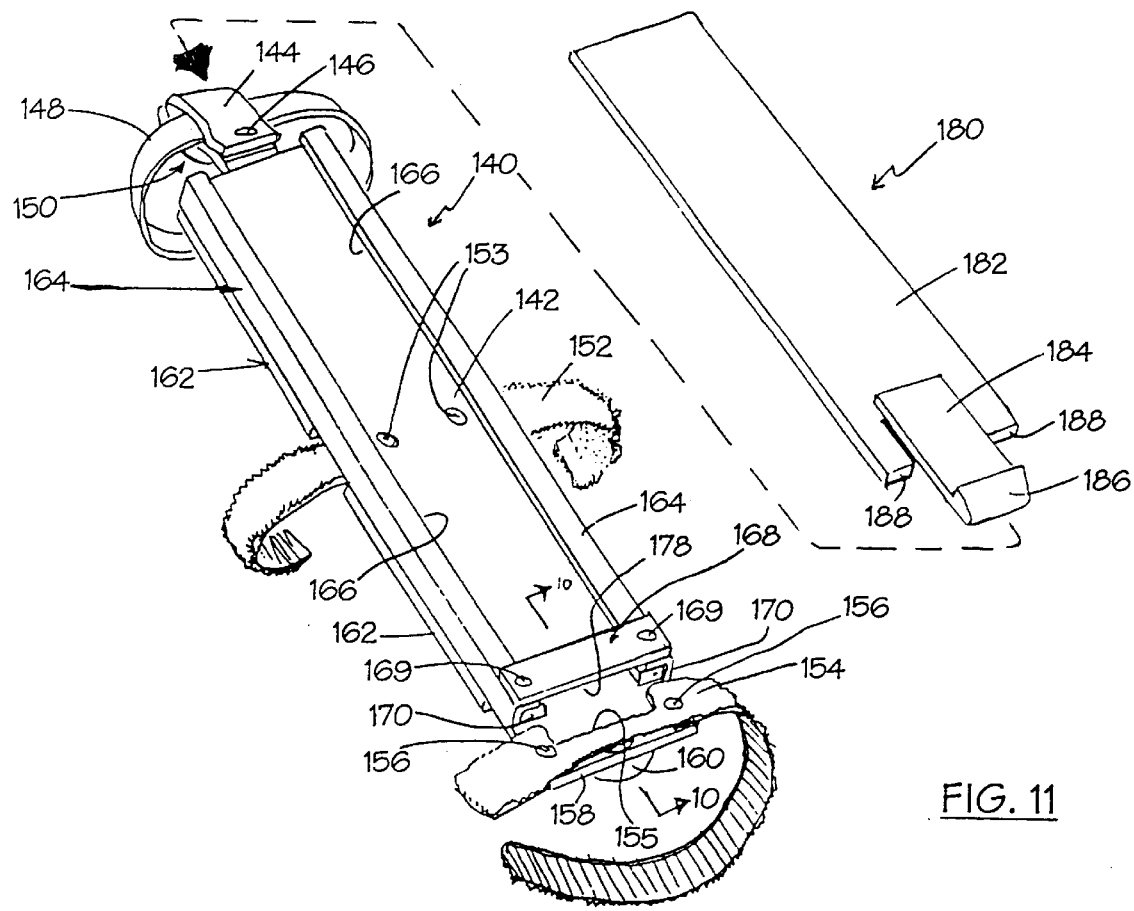
FIG. 11 is an exploded view of aspects of the further alternative embodiment of FIGS. 9 and 10.

Turning to an alternative body depicted in FIGS. 9–11, a securement member 140 is provided that includes a securement body 142, a first strap 144 extending therefrom, an intermediate strap 152 and a second strap 154. As with prior embodiments, first strap 144 may be integrally fabricated with securement body 154. First strap 144 is doubled back on itself and riveted by rivet 146 to capture flexible band 148 therewithin. As shown in FIG. 9, flexible band 148 is dimensioned to extend around region 14 of telephone handset 10. A suction cup 150 may be provided to further strengthen the connection between securement member 140 and telephone handset 10.

Intermediate strap 152 is optionally joined to securement body 142 by rivets 153. Intermediate strap is advantageously fabricated from two-sided Velcro, such that intermediate strap may connect with itself, e.g., when extended around the midsection of handset 10 (see FIG. 9). Thus, the "hooks" and "loops" of intermediate strap 152 facilitate attachment of securement member 140 to handset 10.

A second strap 154 is secured to a substantially planar extension 158 from securement body 142. Rivets 156 connect second strap to planar extension 158. A substantially rectangular cut-out 155 is optionally provided in second strap 154, for reasons discussed hereinbelow. Second strap 154 is preferably fabricated from two-sided Velcro material, thereby permitting ready self-connection as with intermediate strap 152, e.g., when encircling handset 10. A suction cup 160 may be provided to further strengthen the connection between securement member 140 and handset 10. With reference to FIG. 10, suction cup 160 may be joined to a planar extension 158 by passing a stem 161 through an aperture in planar extension 158 and providing a knob 159 to prevent detachment of suction cup 160 from planar extension 158.

Thus, flexible band 148, optional intermediate strap 152, and second strap 154 cooperate to detachably mount securement member 140 onto handset 10. Suction cups 150 and 160 optionally assist in positioning and/or joining securement member 140 to handset 10.

With reference to FIG. 11, an attachment member 180 is provided that includes an attachment body 182 having a deflectable arm 184 that defines a hook 186 at an end thereof. Attachment body 182 is substantially planar and is preferably fabricated from a material that will slide relative to securement body 142. Decorative member(s), such as dog 360 of FIG. 26, may be advantageously joined to attachment body 182 of attachment member 180 through a variety of attachment means, e.g., glue, staples, pins, Velcro and the like. For example, a Velcro pad may be mounted to attachment body 182 and a cooperating Velcro pad may be joined to decorative element(s), thereby facilitating ready attachment therebetween.

As shown in FIG. 11, securement member 140 includes L-shaped side walls 164 that define channels 166. Cross member 168 is riveted to L-shaped walls 164 by rivets 169 and stops 170 are mounted to securement body 142 within channels 166 in the region of cross member 168. Thus, a passage 178 is defined between cross member 168, securement body 142, stops 170 and L-shaped side walls 164. Attachment member 180 is sized to fit within channels 166 such that attachment body 182 may be slid forward until front faces 188 are positioned in close juxtaposition (or in contact) with stops 170. In sliding attachment body 182 forward to the point where front faces 188 approach stops 170, deflectable arm 184 is caused to cam downward so as to pass through passage 178. As hook 186 passes beyond cross member 168, deflectable arm 184 returns to its original, substantially horizontal orientation, thereby bringing hook 186 into engagement with cross member 168. Cut-out 155 formed in second strap 154 accommodates the forward positioning of deflectable arm 184.

A series of frictional rails 162 may be adhered to the bottom of securement body 142 to minimize potential displacement of securement member 140 relative to handset 10. As shown, rails 162 include spacing to facilitate the mounting of intermediate strap 152 to securement body 142. Frictional rails may be fabricated from a variety of materials that will inhibit slippage, e.g., rubber and the like.

Figure 12:
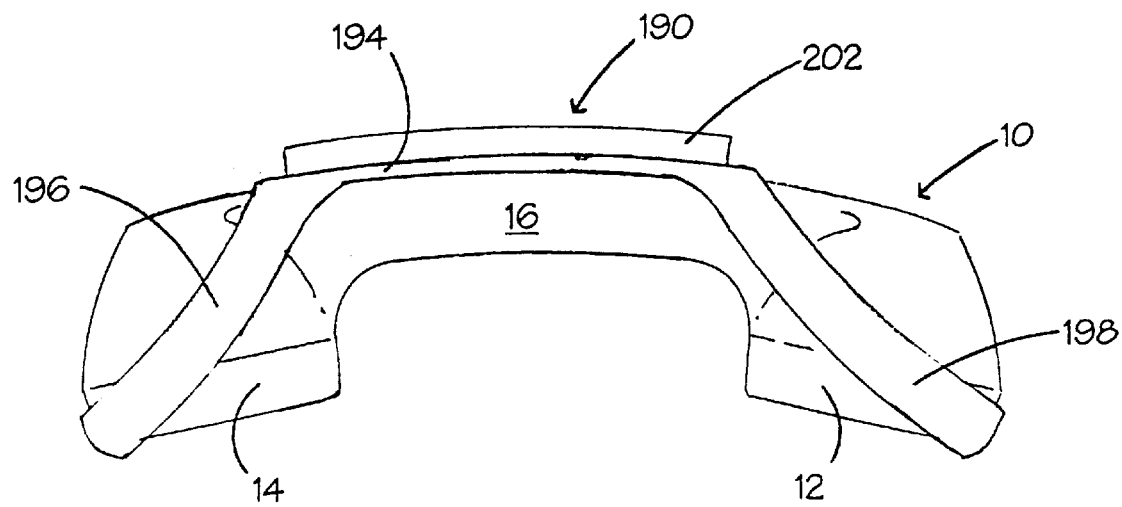
FIGS. 12 and 12a are side views of aspects of an alternative embodiment of a telephone accessory according to the present disclosure that is detachably connected to a first and second phone handsets.
Figure 12A:
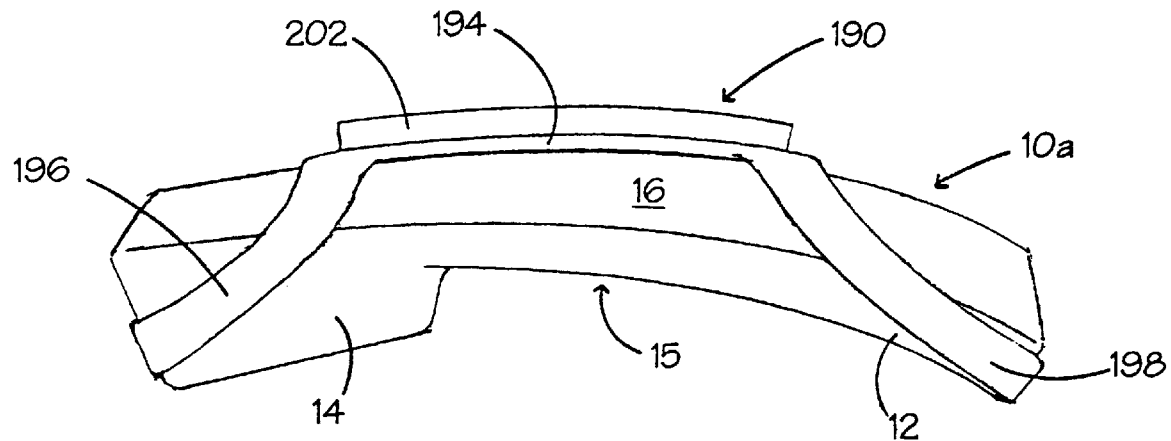
Figure 13:
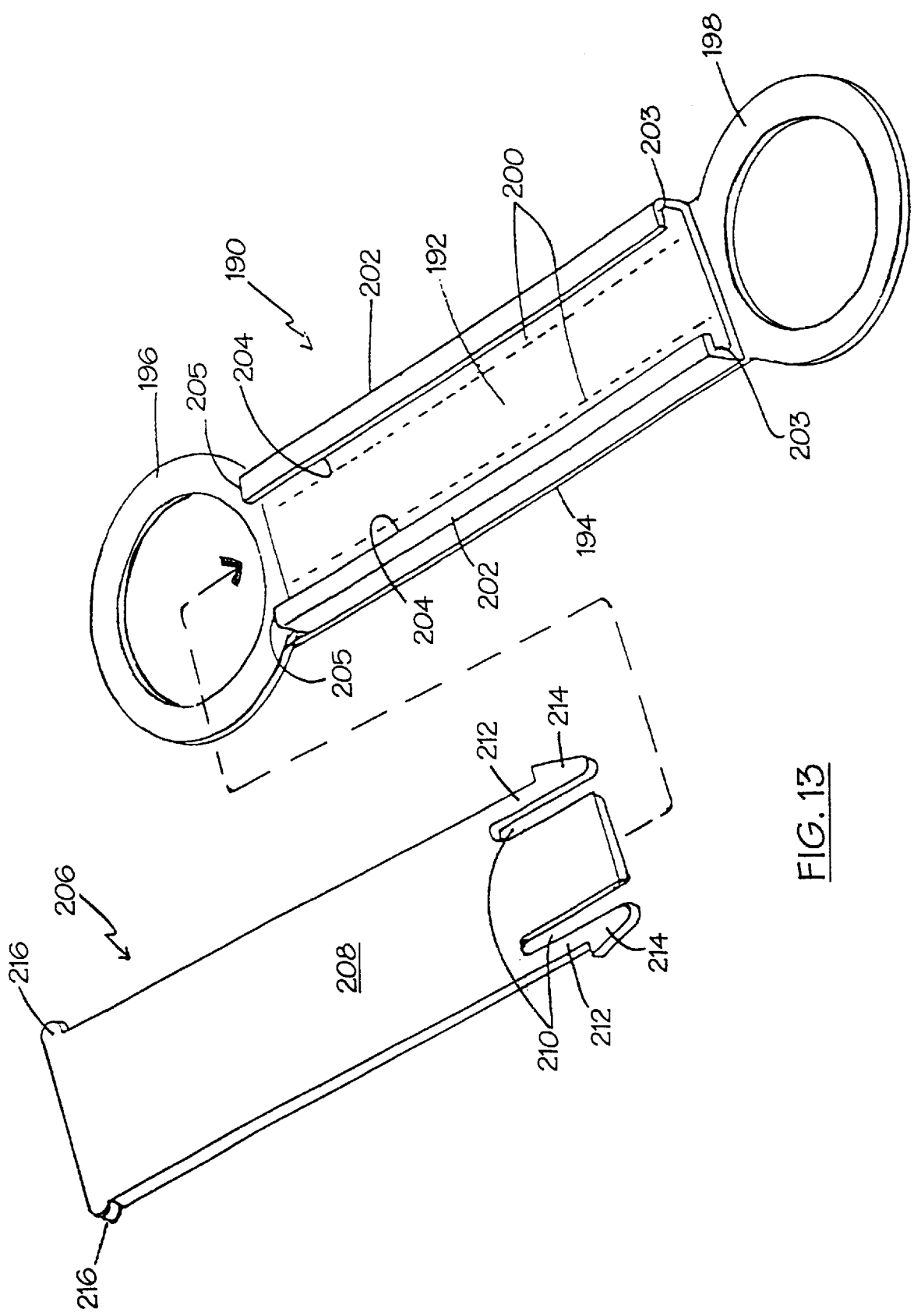

With reference to the alternative embodiment depicted in FIGS. 12, 12a and 13, securement member 190 is adapted to readily mount to telephone handsets 10 and 10a. Of note, telephone handset 10a corresponds to a "touch tone" handset, i.e., a handset having dialing buttons in region 15. Telephone handset 10a, as depicted in FIG. 12a, is illustrative of any such telephone handset in which dialing functionality is built into the underside of handset body 16.

Securement member 190 includes a attachment body 192 to which is joined a stretchable member 194 that defines first and second loops 196, 198. Stretchable member 194 is preferably fabricated from a rubber or rubber-like material, e.g., silicone rubber. The thickness and durometer of such rubber or rubber-like material is selected to enable loops 196, 198 to be readily positioned around regions 12, 14 of handsets 10, 10a, while retaining sufficient strength to prevent failure when placed under tension. In a preferred embodiment, stretchable member 194 is fabricated from a silicone rubber having a thickness of about ⅛ to ¹⁄₃₂ inch and a durometer of about 50. Stretchable member 194 may be joined to securement body 192 through a variety of attachment means, e.g., by utilizing stitches 200, as shown in FIG. 13, glue or the like.

In an alternative embodiment shown in FIG. 13a, securement body 192 may be provided with transverse slots 193 through which stretchable member 194 may be threaded. In this way, the security of the attachment of stretchable material 194 to securement body 192 may be enhanced.

Securement member 190 preferably includes L-shaped side walls 202 that define channels 204. The height of channels 204 are selected to facilitate passage of attachment member 206 therewithin, as discussed below. In a preferred embodiment, securement body 192 and L-shaped side walls 202 are fabricated from a polyethylene extrusion and the height of channels 204 is about ¹⁄₁₆ inch.

Attachment member 206 includes an attachment body 208 having a pair of slots 210 formed at one end thereof. Slots 210 define deflectable arms 212, each of which includes a hook 214. At an opposite end of attachment body 208 are protruding ears 216. Deflectable arms 212 are adapted to cam inward toward slots 210 to permit passage of attachment body 208 within channels 204 of securement body 192. Deflectable arms 212 return to their initial, outward position when attachment body 208 reaches the end of channels 204. At such point, hooks 214 engage the forward faces 203 of L-shaped walls 202, thereby preventing withdrawal of attachment body 208 from channels 204 unless deflectable arms 212 are manually deflected inward. The length of attachment body 208 is preferably selected such that protruding ears 216 engage rear faces 205 of L-shaped walls 202 when hooks 214 are in engagement with forward faces 203, thereby minimizing the play of attachment body 208 relative to securement body 192.

In use, loops 196, 198 are readily stretched around regions 12, 14 of handset 10, 10a, as shown in FIGS. 12 and 12a. Thus, securement member 190 functions as a halter relative to handset 10. A decorative member, such as dog 360 in FIG. 26, is mounted to attachment body 208 through suitable means, e.g., glue, staples, pins, Velcro, combinations thereof, and the like. Attachment body 208 is slid within channels 204 of securement body 192 until hooks 214 extend therebeyond. At such point, hooks 214 move into engagement with forward faces 203 and protruding ears 216 preferably engage rear faces 205.

Figure 13D:
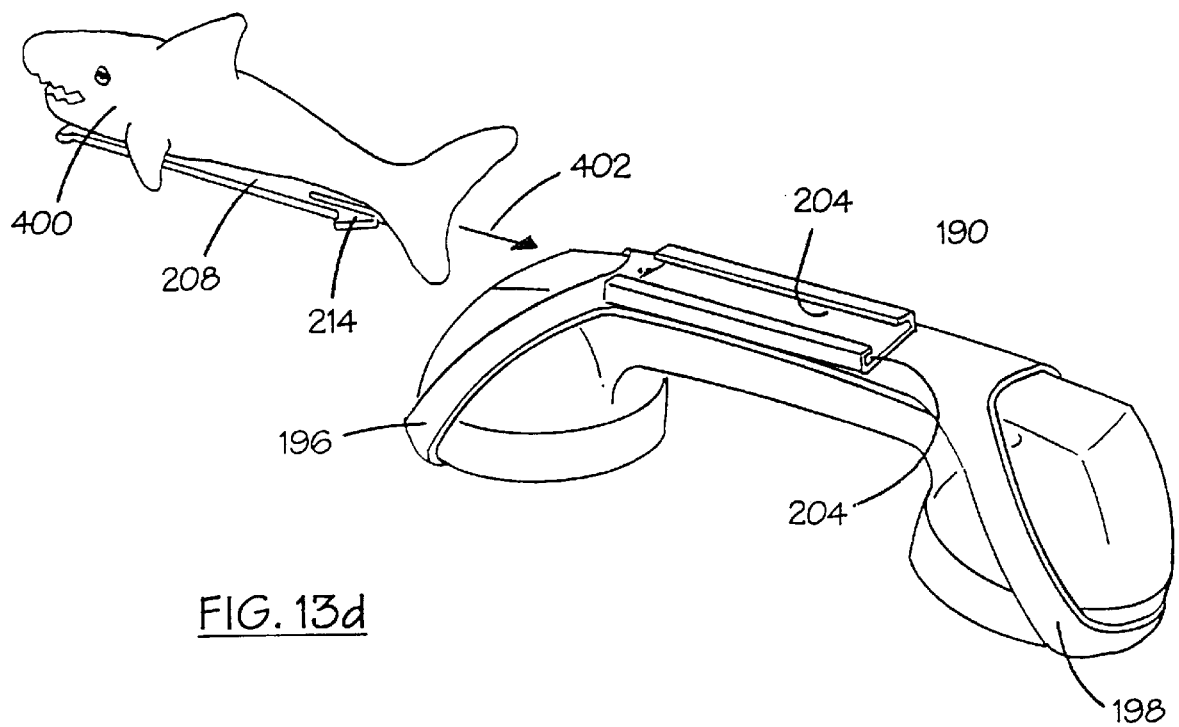
Figure 13E:
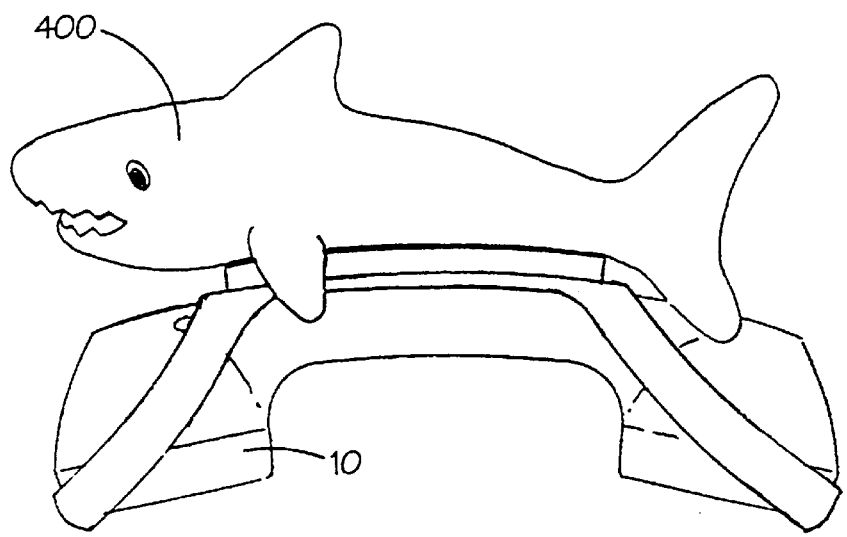

With reference to FIGS. 13b–13e, a further emodiment of the present disclosure, similar in several respects to the embodiment of FIGS. 12, 12a and 13, is depicted. As shown in FIG. 13b, decorative member 400 is in the shape of a shark. The underbelly of shark 400 is secured to attachment body 208 of attachment member 206 by suitable securement means, e.g., glue, velcro, two-sided tape, and the like. Referring to FIG. 13c, securement member 190 is mounted to handset 10 by stretching loops 196, 198 around regions 12, 14 thereof. Thereafter, as shown in FIG. 13d, attachment member 206, with shark 400 mounted thereon, is slid within channels 204 of securement member 190, as shown by arrow 402. Hooks 214 serve to attachment member 206 in position relative to securement member 190. As shown in FIG. 13e, shark 400 provides a novel appearance to handset 10 and based on the curvature of the shark's back, may provide enhanced comfort to the user when utilizing handset 10. Such enhanced comfort may be increased through the fabrication of shark 400 from soft materials and/or by filling shark 400 with compressible or flowable materials.

Turning to the embodiment of FIGS. 14–15, securement member 220 is adapted to cooperate with phone handset 10a. As with FIG. 12a, handset 10a is intended to represent all handsets in which dialing functionalities are provided in region 15. However, as with securement member 190, securement member 220 is ideally suited to cooperatively engage any handset, including conventional handsets that are attached to a base by a cord. Thus, securement member 220 is believed to have universal applicability.

Securement member 220 includes a securement body 222 to which is joined a sheet 224 that is preferably fabricated from a material that is substantially clear, e.g., a substantially clear vinyl. Sheet 224 may be joined to securement body 222 through a variety of joining means, e.g., stitches 226 as depicted in FIG. 15. A Velcro strip 230 is mounted to a first edge 228 of sheet 224, e.g., by stitching. In a preferred embodiment of securement member 220, a fabric backing 232 underlies Velcro strip 230 to facilitate secure mounting of Velcro strip 230 to sheet 224. A second Velcro strip 236 is mounted to a second edge 234 of sheet 224, preferably through stitching in conjunction with fabric backing 238. Sheet 224a may optionally be fabricated from a second material, e.g., an elastic sheet material, to facilitate mounting of securement member 220 to handsets of different geometries. The two sheet materials making up sheet 224 and 224a may be combined when joined to securement body 222, as will be readily apparent. Velcro strips 230 and 236 are selected such that one of such Velcro strips features "hooks" and the other such strip features "loops," as will also be readily apparent to persons of skill in the art.

Securement body 222 includes L-shaped side walls 240 that define channels 242, forward faces 246 and rear faces 248. Attachment member 206, as described hereinabove, is adapted to interact with securement member 220. Thus, securement body 208 is adapted to slide within channels 242, hooks 214 are adapted to engage forward faces 246, and protruding ears 216 are adapted to engage rear faces 248. Attachment member 206 is adapted to interact with a plurality of decorative members, as discussed hereinabove.

In use, securement member 220 is advantageously detachably secured to handset 10a by wrapping sheet 224 around the midsection of handset body 16 and associating Velcro strip 236 with Velcro strip 230. Clear sheet 224 permits a user to readily access and utilize the dialing functionalities located in region 15. Thus, securement member 220 permits unencumbered use of handset 10a, while simultaneously facilitating ready attachment of decorative member(s) to attachment member 208.

Figure 17:
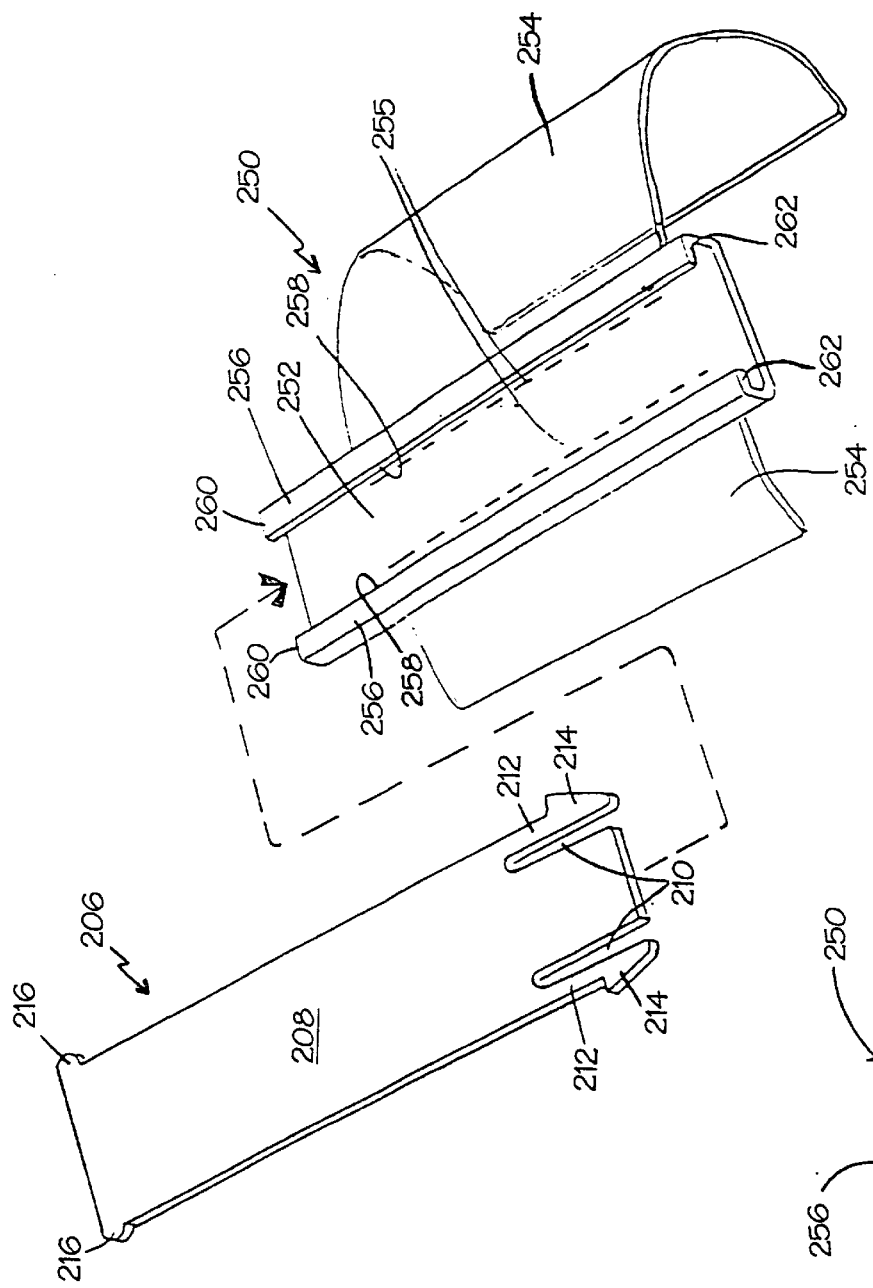
FIG. 17 is an exploded view of aspects of the additional embodiment of FIG. 16.
Figure 16:
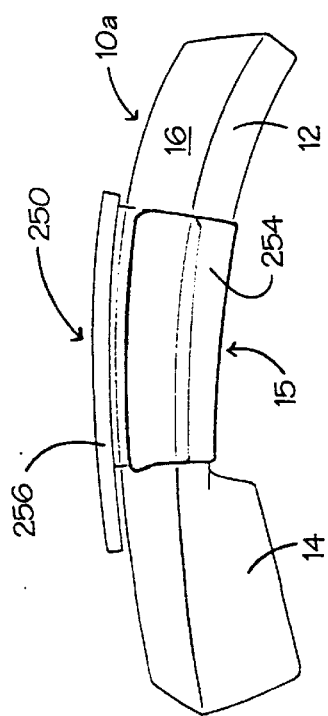
FIG. 16 is a side view of aspects of an additional embodiment of a telephone accessory according to the present disclosure that is detachably connected to a phone handset.

Turning to the embodiment of FIGS. 16–17, securement member 250 is adapted to be detachably secured to handset 10a, i.e., a handset in which the dialing functionality is provided in region 15, or a conventional handset that interacts with a base by way of a cord. Securement member 250 includes a securement body 252 to which is joined a sheet 254 that is dimensioned and configured to encircle handset 10a in the midsection of body 16. Sheet 254 is fabricated from a clear, static vinyl material that is characterized by an inherent "cling" functionality. Thus, sheet 254, when brought into juxtaposition with itself, i.e., into an overlapping relationship, inherently binds to itself. Sheet 254 is joined to securement body 252 through appropriate means, e.g., stitches 255. L-shaped side walls 256 are associated with securement body 252 to define channels 258, forward faces 262 and rear faces 260. Thus, with securement member 250 detachably mounted to handset 10a by wrapping sheet 254 therearound and bringing sheet 254 into an overlapping, static "cling" orientation and attachment member positioned within channels 258 as described hereinabove with respect to prior embodiments, decorative member(s) may be readily associated with handset 10a to personalize and/or decorate handset 10a, e.g., according to a user's personal taste.

With reference to FIGS. 18–19, an alternative securement member 270 that includes a securement body 272 to which is joined a sheet 274 through appropriate means, e.g., stitches 282. Sheet 274 is fabricated from a clear or translucent material, e.g., translucent silicone rubber to facilitate mounting of securement member 270 to handsets 10a of differing geometries. At the exposed edge 275 of sheet 274 is mounted a Velcro strip 276 through appropriate means, e.g., stitches 278. A second Velcro strip 280 is mounted to securement body 272, e.g., by way of stitches 282. As will be apparent to persons of skill in the art, Velcro strips 276, 280 are selected such that one of the strips features "loops" whereas the other strip features "hooks." Securement member 270 includes L-shaped side walls 282 that define channels 284, forward faces 286 and rear faces 288. Thus, securement member 270 is configured to cooperate with attachment member 206 in the same manner as securement members 190, 220 and 250 described hereinabove.

In use, sheet 274 advantageously encircles the midsection of handset 10a such that the translucent material from which sheet 274 is fabricated permits ready access to and use of the dialing functionalities of handset 10a in region 15. Moreover, the stretchable functionality associated with sheet 274 facilitates use of securement member 270 with handsets of various sizes and geometries. Attachment member 206 may be slid within channels 284 to provide a user with the ability to display a variety of decorative members in association with handset 10a.

Figure 21:
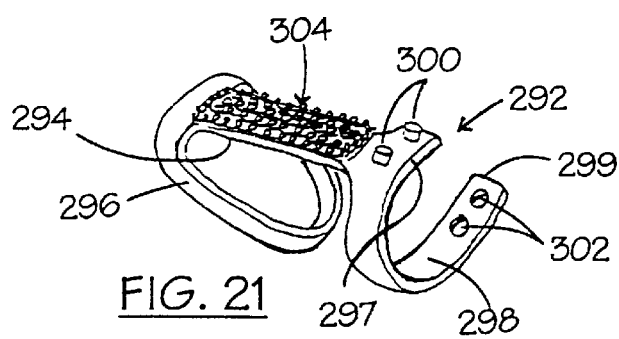
FIG. 21 is a plan view of an aspect of a telephone accessory of the present disclosure that corresponds to the phantom depiction of FIG. 20.
Figure 20:
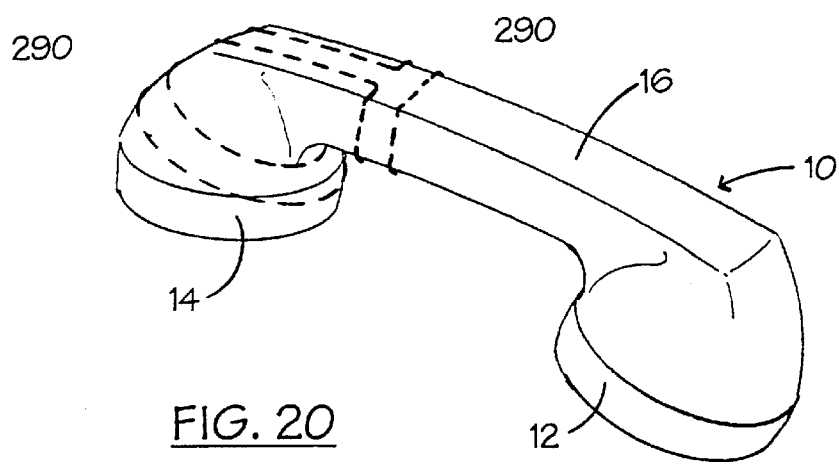
FIG. 20 is a plan view of a telephone handset with the placement of an aspect of an embodiment of the present disclosure depicted in phantom.

Turning to FIGS. 20–23, a further embodiment of the present disclosure is depicted. With reference to FIGS. 20 and 21, a handset 10 is adapted to receive a securement member 292 in the manner depicted by phantom lines 290. Securement member 292 includes a securement body 294 from which extends a loop 296 and a strap 298. Loop 296 is preferably fabricated from a stretchable material, e.g., a rubber or rubber-like material. Strap 298 extends from the opposite end of securement body 294. Optionally, securement body 294, loop 296 and strap 298 are integrally fabricated, e.g., molded, from the same material.

Strap 298 preferably includes a mechanism for detachably securing free end 299 to flange portion 297, e.g., when strap 298 encircles handset body 16. In a preferred embodiment, flange portion 297 is provided with a pair of projecting studs 300 which are adapted to interact with apertures 302 formed adjacent free end 299. Depending on the size and geometry of handset 10, one or both of the studs 300 and apertures 302 may be brought into engagement. Alternative mechanisms for securing strap 298 around handset 10 are contemplated, e.g., cooperative Velcro strips and brackets with pull-tie straps. A Velcro pad 304 is mounted to securement body 294, e.g., through stitching, glue, or the like, so as to interact with attachment member 310 discussed hereinbelow. Thus, loop 296 is configured and dimensioned to encircle region 14 of handset 10 while strap 298 is configured and dimensioned to encircle handset body 16 and become secured in such orientation, e.g., through cooperative studs 300 and apertures 302.

Figure 23:
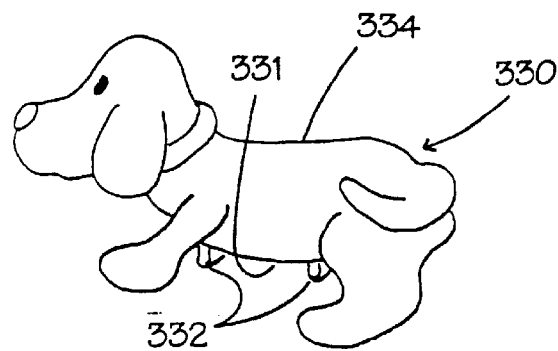
FIG. 23 is a plan view of an exemplary decorative element of the present disclosure that may function with various embodiments of the present disclosure.
Figure 22:
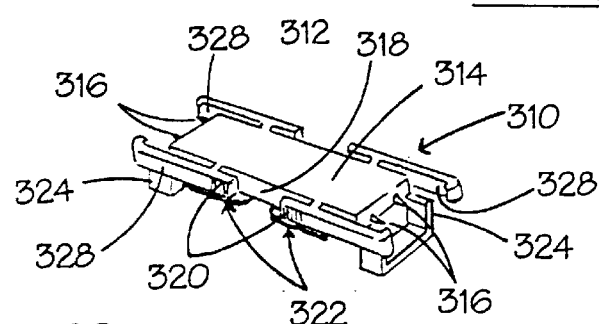
FIG. 22 is a plan view of an aspect of a telephone accessory of the present disclosure that may function with various embodiments of the present disclosure.

Referring to FIGS. 22 and 23, attachment member 310 includes an attachment body 312 that defines a central block 314 from which a plurality of pointed pins 316 laterally extend. Central block 314 includes side walls 318 that preferably include knurled regions 320 to facilitate handling thereof. Velcro pads 322 are mounted to the underside of attachment body 312, e.g., by stitching, glue or the like. Capture plates 324 are pivotally joined to attachment body 312 such that capture plate 324 may be pivoted into juxtaposition with pointed pins 316, capturing a portion of decorative member 330 therewithin. Deflectable side wall extensions 328 are adapted to engage capture plates 324 when pivoted into such juxtaposed orientation, thereby maintaining such positioning of capture plates 324 until deflectable side wall extensions 328 are moved out of engagement therewith.

With specific reference to FIG. 23, exemplary decorative member 330 is a dog character. Decorative member 330 may be fabricated from a variety of materials, e.g., vinyl, plush, fabric, molded plastic, and the like. Decorative member 330 may be specially fabricated for use as part of a telephone accessory according to the present disclosure, or may be a conventional animal, character or the like. For example, conventional stuffed animals and characters, beanie babies, molded toy and novelty items, and the like, may be used in association with an attachment member according to the present disclosure. Examples of contemplated decorative items include animals (e.g., bulls, bears, sharks, dogs, cats, eagles, reindeer, bunnies, etc.), cartoon characters (e.g., Disney characters, Simpsons, Jetsons, etc.), sports-related items (e.g., sports players, team mascots, uniform-related items, etc.), newsmakers (e.g., politicians, media personalities, business personalities, etc.), mechanical items (e.g., sportscars, airplanes, motorcycles, etc.), seasonal items (e.g., Christmas themed-items, Easter-themed items, birthday-themed items, etc.), and abstract items. Decorative items that may be used as part of the telephone accessory of the present disclosure may include light, sound and/or interactive features, e.g., blinking lights, voice and/or sound generation functionality, motorized movement, and the like. Such light, sound and/or interactive features may be controlled by manual switches associated with the item, or through remote actuation.

With particular reference to FIG. 330, decorative item 330 includes projections 332 extending from the underside 331 thereof. Projections 332 facilitate interaction with pins 316 and capture plates 324 of attachment member 310, as discussed hereinabove. Projections 332 may be fabricated from a relatively rigid material, e.g., a plastic material, or may be fabricated from a more pliable material, e.g., a fabric. Projections 332 are thus adapted to be pierced by pins 316 and clamped by capture plates 324 so as to detachably secure decorative item 330 to attachment member 330. It is expressly contemplated, however, that decorative items need not have projections 332 or any specific structural element extending from or associated with such decorative item to facilitate attachment to attachment members according to the present disclosure. The slope/geometry of top face 334 of decorative element 330 is preferably designed to facilitate cradling of decorative element 330 against the shoulder of a user, as will be readily understood by persons of skill in the art.

Figure 24:
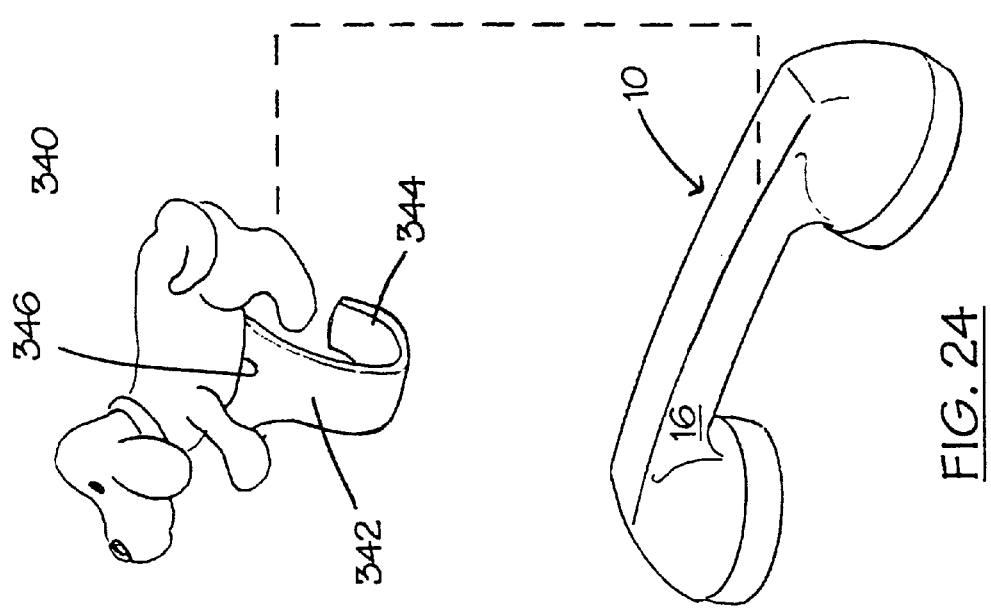
Figure 27:
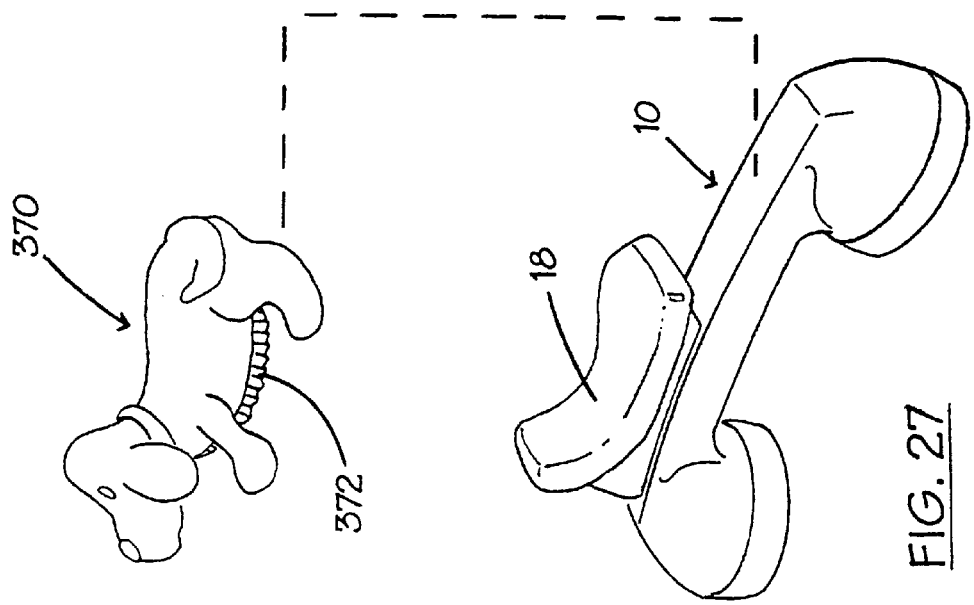

Turning to FIGS. 24–27, a series of alternative securement/attachment mechanisms according to the present disclosure are depicted. In the embodiment of FIG. 24, decorative item 340 includes a downwardly extending securement member 342 that defines a hook 344 having a radius of curvature configured and dimensioned to engage the midsection of handset body 16. Securement member 342 is attached to decorative item 340 by an appropriate attachment means, e.g., glue, Velcro, stitching or the like at region 346. Preferably, securement member 342 is sewn into the underside of decorative item 340.

Figure 25:
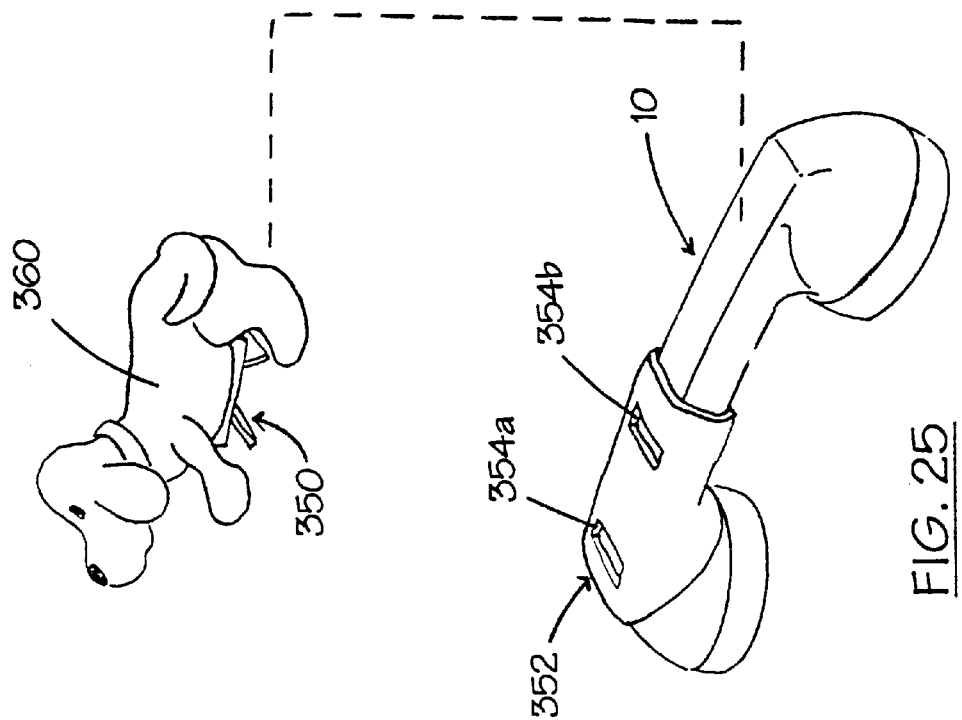
FIGS. 24–27 are exploded plan views depicting various interactive aspects of embodiments of the present disclosure.

With reference to FIGS. 25 and 26, decorative item 360 is adapted to be mounted to attachment member 350 along face 348, e.g., by glue, stitching, Velcro or the like. Decorative item 360 may be permanently affixed to attachment member 350 or removably secured thereto. A pair of downwardly extending tabs 356 are associated with attachment member 350. A securement member 352 is detachably secured to handset 10 in much the same manner as securement member 292 of FIG. 21. Securement member 352 includes a pair of slots 354a, 354b that are adapted to receive tabs 356, thereby clipping attachment member 350 to securement member 352. With reference to the alternative embodiment of FIG. 27, decorative item 370 includes a sleevelike securement member 372 mounted to the underside thereof. Sleevelike securement member 372 may be attached to decorative item 370 through a variety of attachment means, e.g., stitching, Velcro and the like. Sleevelike securement member is adapted to receive shoulder rest 18 that is mounted on handset 10, thereby detachably securing decorative item 370 to handset 10.

The above-described embodiments are merely illustrative of the principles of the present disclosure. Other embodiments of the present disclosure will be apparent to those of skill in the art without departing from the spirit and scope of the present invention. The disclosed embodiments are intended to be exemplary embodiments of the present disclosure, but are not intended to be limiting thereof.

What is claimed is:

1. An accessory for enhancing aesthetics and functionality of a telephone handset comprising:
    an elongated securement member for detachably mounting to the telephone handset, said elongated securement member including a first loop extending from a first end, a second loop extending from a second end, and opposing L-shaped side walls intermediate the first and second loops;
    an elongated attachment body for detachably engaging the elongated securement member, said elongated attachment body including deflectable arms on one end, protruding ears on another end and a decorative member extending therefrom;
    wherein, in use, the first and second loops are coupled around opposing ends of the telephone handset and the deflectable arms are cammed inward to pass the elongated attachment body within the opposing L-shaped side walls until the deflectable arms extend out of the opposing L-shaped side walls and undeflect, so as to detachably secure the elongated attachment body to the securement body; and
    wherein said decorative member enhances the aesthetics and an ease and comfort of use of the telephone handset.

2. A telephone accessory as recited in claim 1, wherein the first and second loop are fabricated from a stretchable material.

3. A telephone accessory as recited in claim 1, wherein the deflectable arms define slots for facilitating deflection and include hooks for locking the elongated attachment body to the elongated securement member.

4. A telephone accessory according to claim 1, wherein said securement member is adapted to be detachably secured to a telephone handset selected from the group consisting of cordless handsets and handsets that included cords.

5. A telephone accessory according to claim 1, wherein said decorative member is fabricated at least in part from a material selected from the group consisting of vinyl, plush, fabric and molded plastic.

6. A telephone accessory according to claim 1, wherein said decorative member includes a visual appearance selected from the group consisting of an animal, a cartoon character, a sports item, a newsmaker, a mechanical item, a seasonal item, an abstract item, and combinations thereof.

7. A telephone accessory according to claim 1, wherein said decorative member includes a mechanism for delivering light, sound or other interactive functionality.

8. A telephone accessory according to claim 4, wherein said telephone handset is cordless and wherein said extension is fabricated at least in part from a material that is clear or translucent, such that dialing functions associated with said cordless telephone handset may be accessed through said clear or translucent material.

* * * * *